R. L. DEZENDORF.
GAS METER.
APPLICATION FILED DEC. 19, 1913.
1,160,391.
Patented Nov. 16, 1915.
4 SHEETS—SHEET 2.
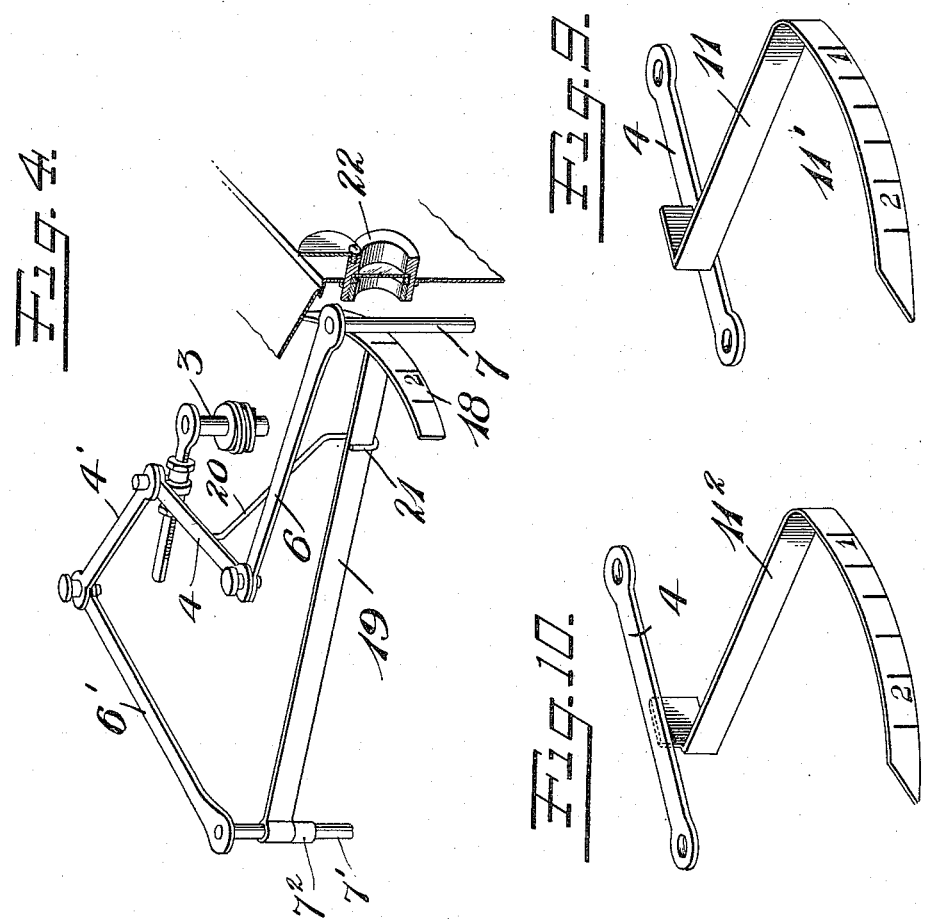

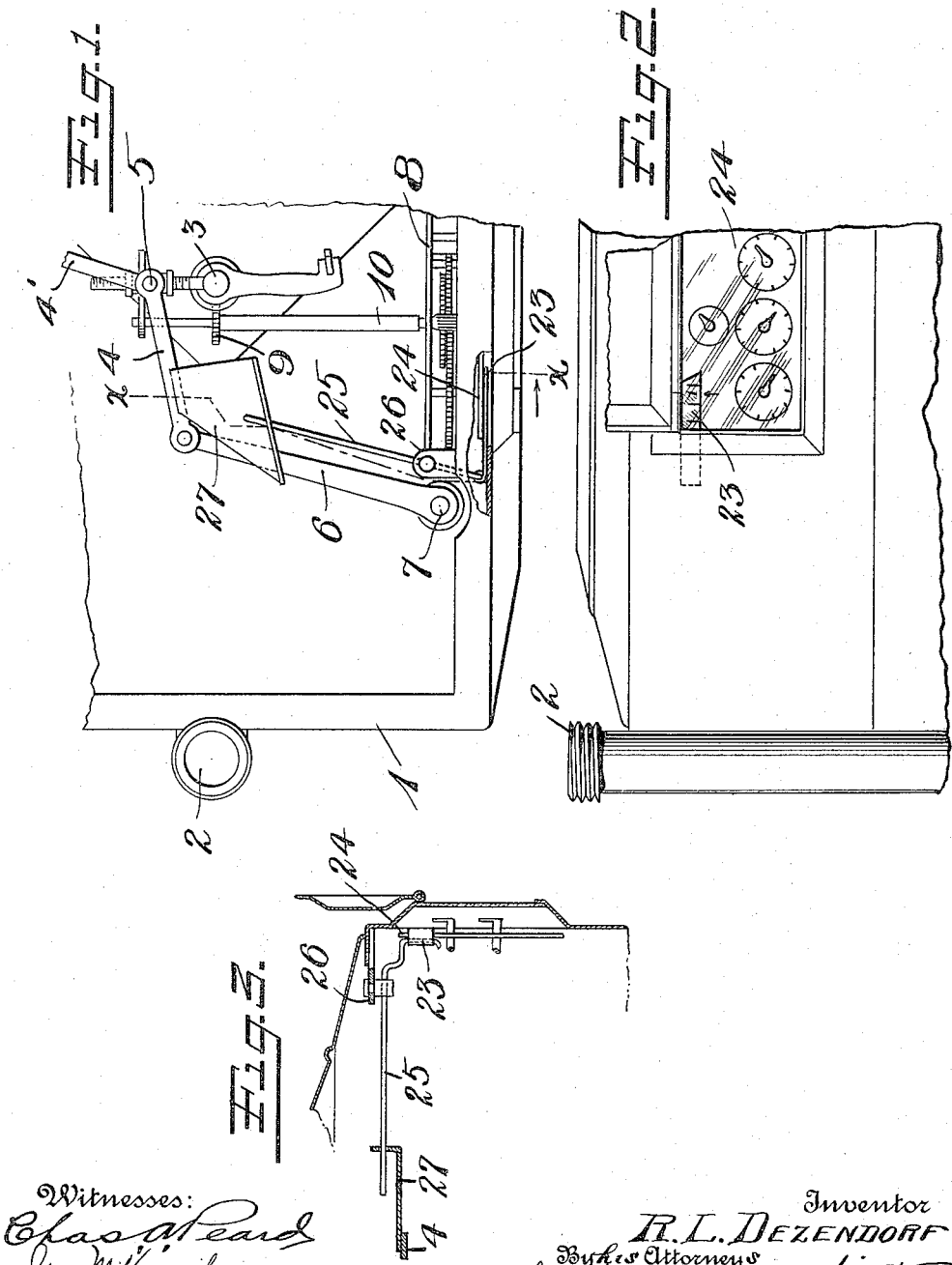

R. L. DEZENDORF.
GAS METER.
APPLICATION FILED DEC. 19, 1913.
1,160,391.
Patented Nov. 16, 1915.
4 SHEETS—SHEET 3.
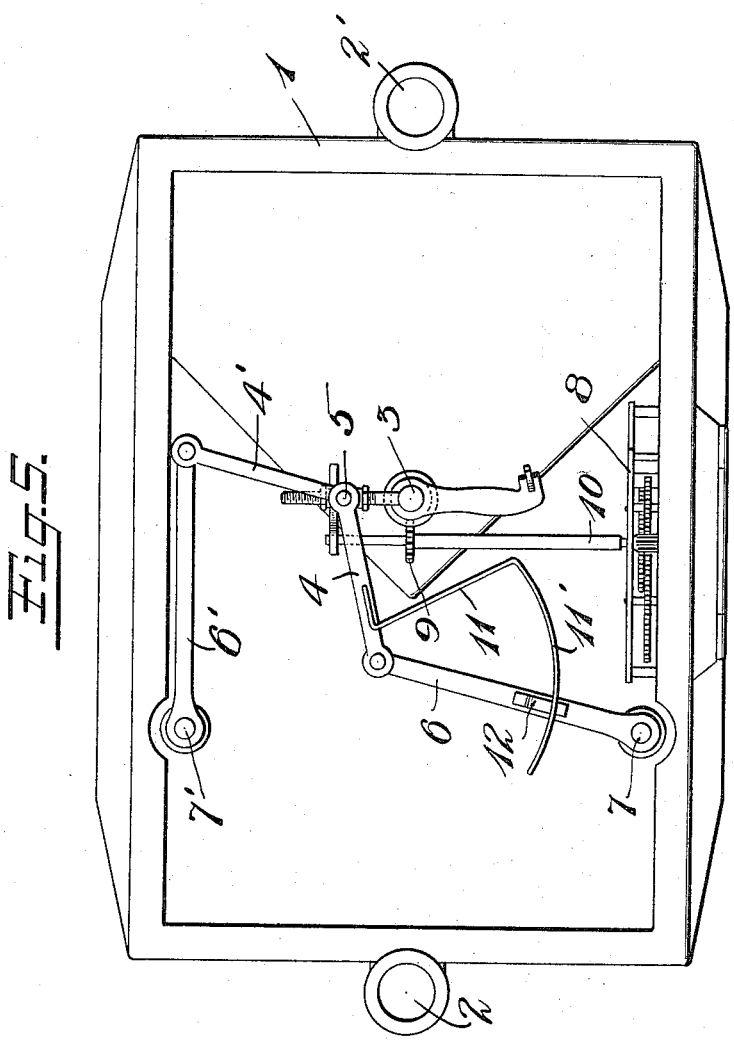

R. L. DEZENDORF.
GAS METER.
APPLICATION FILED DEC. 19, 1913.
1,160,391.
Patented Nov. 16, 1915.
4 SHEETS—SHEET 4.
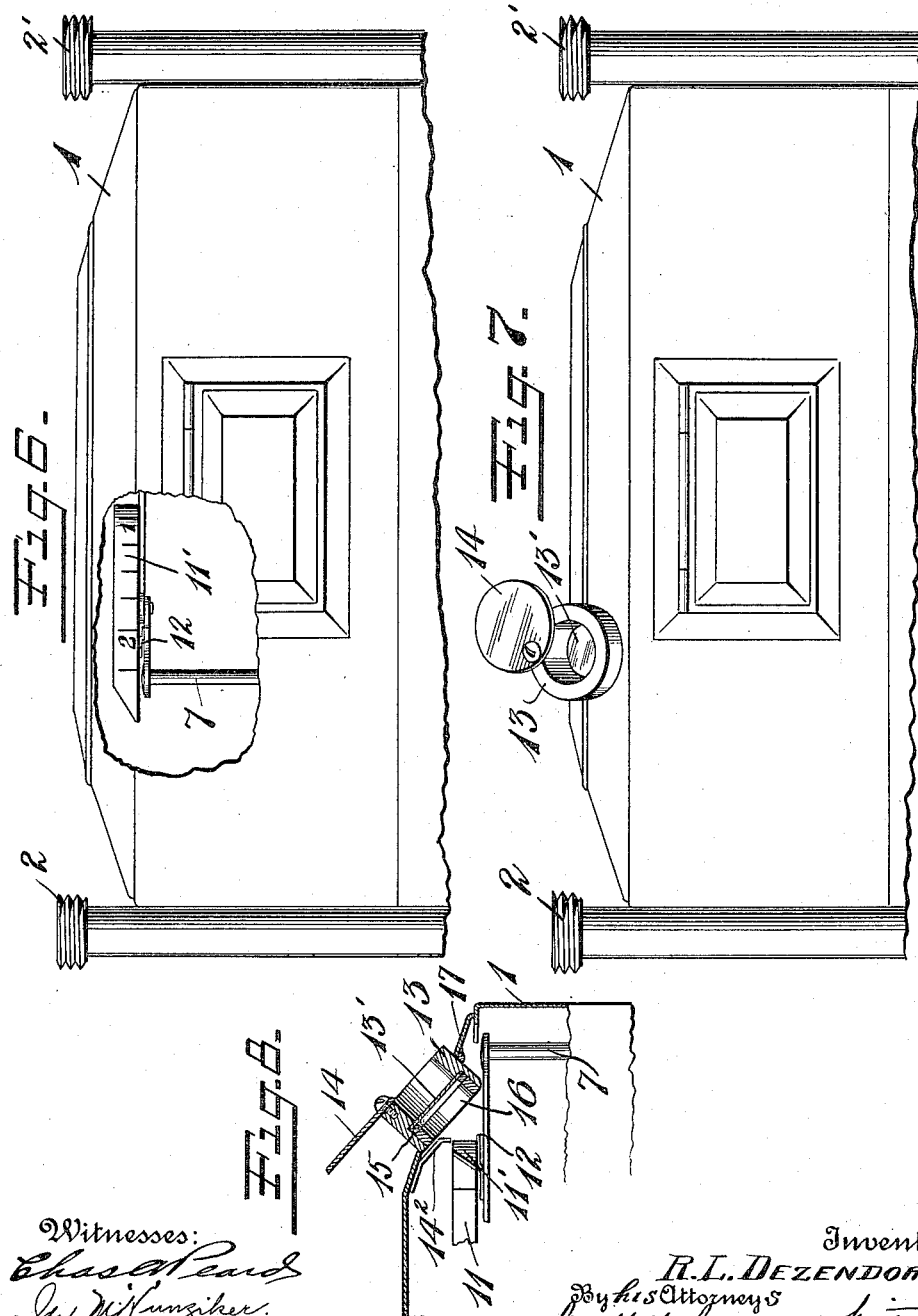

UNITED STATES PATENT OFFICE.

RICHARD L. DEZENDORF, OF RICHMOND HILL, NEW YORK.

GAS-METER.

1,160,391.

Specification of Letters Patent.

Patented Nov. 16, 1915.

Application filed December 19, 1913. Serial No. 807,574.

*To all whom it may concern:*

Be it known that I, RICHARD L. DEZENDORF, a citizen of the United States, residing at Richmond Hill, county of Queens, State of New York, have invented certain new and useful Improvements in Gas-Meters, of which the following is a full, clear, and exact description.

My invention relates to improvements in gas meters, and has for its object to provide a simple and sensitive indicator operating in connection with one of the lower flag-arms of the meter, whereby when the meter mechanism is moving at even a slow rate, such movement will be clearly indicated.

It further has for its object to provide an inexpensive and efficient indicator in which the speed of the indicator during all periods is sufficiently rapid to be clearly perceptible.

The following is a description of an embodiment of my invention, reference being had to the accompanying drawings, in which—

Figure 1 shows a plan view of a meter embodying one form of my invention, with the cover removed. Fig. 2 is a front elevation of the upper portion of said meter. Fig. 3 shows a transverse section of Fig. 1 on the line $x$—$x$. Fig. 4 shows in perspective a modified embodiment of my invention. Fig. 5 shows a plan view of a modification with the cover removed. Fig. 6 is a front elevation of the same with a portion of the case broken away. Fig. 7 shows the same front elevation with a peep-hole through the casing for observing the indicator. Fig. 8 shows a transverse section of the meter casing through the peep-hole and a portion of the indicator in side elevation. Fig. 9 shows a detail of the indicator of Fig. 5. Fig. 10 shows a modification of that particular form.

Referring more particularly to the drawings, 1 is the meter casing having an inlet 2. 3 is a crank shaft to which the lower flag arms 4—4' are connected through the tangent post 5.

6 is one of the upper flag arms connected to the flag wire 7 in the ordinary manner.

The use of the terms "upper" and "lower" in reference to the portions of the flag arms follows the ordinary use of those terms in connection with the two portions of the human arm.

8 is the ordinary indicator train driven by the spur wheel 9 upon the shaft 10.

For the purpose of indicating small movements of the mechanism by means embodying my invention, I provide an indicator connected to one of the lower flag arms in a suitable manner. In the preferred form, this indicator is a slide 23 located in front of the dial 24 of the ordinary registering device. This slide 23 is operated by a lever 25, which is fulcrumed in a lug 26 secured to the meter casing 1, the rear end of the lever 25 being engaged by the upturned flange of a plate 27 secured to the lower flag arm 4 passing through a hole in said flange.

As gas passes through the meter, the flag wires and flag arms move to operate the crank shaft in the ordinary manner. When the upper flag arm 6 and its flag wire 7 reach either end of their movements, they pause for a considerable period. During this pause, the lower flag arm 4 is moving at a rapid rate about its axis formed by the outer end of the flag arm 6, with the result that the plate 27 moves the lever 25 so as to cause the indicator 23 to move at a comparatively rapid rate during substantially all the time that the meter is in operation, the rapid movement being due in part to the longitudinal movement of the lower arm 4 caused by the rapid oscillation of the upper arm 6 and part of the time to the comparatively rapid movement of the lower arm 4 about the axis formed by the free end of the upper arm 6. With this arrangement, the reversals of the movements of the indicator 23 are substantially instantaneous, so that the indicator is moving at a relatively rapid rate during substantially the whole period of operation of the meter. Substantially the same result can be obtained by mounting the indicator upon an arm which is fulcrumed at the back of the meter, and which is actuated by a yoke depending from the lower flag arm 4. This arrangement is shown in Fig. 4, in which 18 is the indicator and 19 is the lever carrying the same having its lower end surrounding the rear flag arm 7'. This lever is not attached to the rear flag wire, but is free to move thereon, being supported by a collar $7^2$ which is secured to said flag wire. Projecting from the lower flag arm 4 is a yoke 20 having an upturned end 21, within which the lever 19 lies. This yoke projects well toward the front of the meter. As the meter operates, the flag arm 4 moves so as to move the lever 19 with the indicator 18 at a rapid rate during substantially all the period of operation of the meter, the yoke 20 sliding upon the arm 19 to permit such movements. The indicator is visible through a peep-hole 22 in the front wall of the meter.

Another form of indicator actuated by the lower flag arm 4 is shown in Figs. 5, 6, 7 and 8. In this form 11 is the indicator rigidly connected in any suitable manner to the lower arm 4. This indicator has a portion extending in a forward direction substantially at right angles to the lower arm 4 and carrying a segmental graduated portion 11'. This graduated portion rests on a support 12 carried by the upper arm 6 so as to relieve the lower arm 4 of any strain. At the top of the meter, I provide a peep-hole consisting of the bushing 13 having a movable cover 14. The inner end of this bushing is provided with a recess which forms a seat for the glass 13', which is held in position by a gasket 15 and a holding ring 16, the latter being held in place by any suitable means, as for instance, by solder. The bushing 13 is soldered in an opening in the meter top, the solder being applied on the inside, as at 17, so that the bushing cannot be tampered without detection.

$14^2$ is a marker to assist in reading the indicator 11'. As gas passes through the meter from the inlet 2 to the outlet 2', the segmental portion 11' is kept in motion at a rapid rate during substantially all the time that the meter is in operation. The segmental portion can be attached to the lower side of the flag arm 4, as indicated in Fig. 10, in which case, however, a peep-hole such as 22 shown in Fig. 4, is provided in the front wall of the meter casing.

As will be evident to those skilled in the art, the apparatus permits of various other modifications without departing from the spirit of my invention or the scope of the appended claims.

What I claim is:

1. In a meter, a combination of the meter mechanism including front and rear flag wires, two upper and two lower flag arms and a crank shaft operated thereby, of an indicator operatively connected to one of said lower arms and visible through the meter casing.

2. In a meter, the combination of the meter mechanism including front and rear flag wires, two upper and two lower flag arms, and a crank shaft operated thereby, with a movable indicator visible through the meter casing, a lever for operating the same, means connected to one of the lower flag arms for actuating said lever, and a fulcrum for said lever.

3. In a meter, the combination of the meter mechanism including front and rear flag wires, two upper and two lower flag arms, and a crank shaft operated thereby, with a movable indicator visible through the meter casing, a lever for operating the same, means connected to one of the lower flag arms for actuating said lever, and a fulcrum for said lever between said lower flag arm and said indicator, said fulcrum being located adjacent to one of the flag wires.

4. In a meter, the combination of the meter mechanism including front and rear flag wires, two upper and two lower flag arms, and a crank shaft operated thereby, with a movable indicator visible through the meter casing, a lever for operating the same, means connected to one of the lower flag arms for actuating said lever, and a fulcrum for said lever, said fulcrum being supported by the meter casing.

5. In a meter, the combination of the meter mechanism including front and rear flag wires, two upper and two lower flag arms, and a crank shaft operated thereby, with a movable indicator visible through the meter casing, a lever for operating the same, means connected to one of the lower flag arms for actuating said lever, and a fulcrum for said lever between said lower flag arm and said indicator, said indicator being pivoted to said lever and moving parallel to one side of the meter casing.

RICHARD L. DEZENDORF.

Witnesses:
H. B. BROWNELL,
E. E. MORSE.

Copies of this patent may be obtained for five cents each, by addressing the "Commissioner of Patents, Washington, D. C."